United States Patent
Vollmer et al.

(10) Patent No.: US 6,879,830 B1
(45) Date of Patent: Apr. 12, 2005

(54) METHOD FOR HANDOVER, MOBILE STATION FOR HANDOVER AND BASE STATION FOR HANDOVER

(75) Inventors: Vasco Vollmer, Gartow (DE); Markus Radimirsch, Laatzen (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/478,586

(22) Filed: Jan. 6, 2000

(30) Foreign Application Priority Data

Jan. 8, 1999 (DE) ......................................... 199 00 436

(51) Int. Cl.$^7$ ................................................ H04Q 7/20
(52) U.S. Cl. ...................... 455/442; 455/436; 455/437; 455/439; 455/524; 455/525; 455/502; 370/331; 370/332; 370/350
(58) Field of Search ................................. 455/442, 436, 455/437, 439, 524, 525, 502, 67.1, 62, 422; 370/331, 328, 329

(56) References Cited

U.S. PATENT DOCUMENTS

| 5,507,006 A | * | 4/1996 | Knight ........................ 455/33.1 |
| 5,513,380 A | * | 4/1996 | Ivanov et al. ............... 455/33.2 |
| 5,561,844 A | * | 10/1996 | Jayapalan et al. ........... 455/442 |
| 5,790,528 A | * | 8/1998 | Muszinski .................. 370/331 |
| 5,794,149 A | * | 8/1998 | Hoo ............................. 455/438 |
| 5,991,626 A | * | 11/1999 | Hinz et al. ................... 455/436 |
| 6,026,300 A | * | 2/2000 | Hicks ........................... 455/434 |
| 6,230,013 B1 | * | 5/2001 | Wallentin et al. ........... 455/436 |
| 6,252,860 B1 | * | 6/2001 | Pillekamp ................... 370/330 |
| 6,266,527 B1 | * | 7/2001 | Mintz .......................... 455/423 |
| 6,278,881 B1 | * | 8/2001 | Balck ........................... 455/444 |
| 6,301,242 B1 | * | 10/2001 | Lindsay et al. ............. 370/347 |
| 6,311,065 B1 | * | 10/2001 | Ushiki et al. ................ 455/440 |
| 6,628,630 B1 | * | 9/2003 | Nagase ........................ 370/331 |

\* cited by examiner

*Primary Examiner*—Marceau Milord
(74) *Attorney, Agent, or Firm*—Kenyon & Kenyon

(57) ABSTRACT

A method for handing over a link between a mobile station and a network from a first base station to a second base station of the network. In the case of an existing link, link data for the link are stored in the base station in question and resources of the base station are held in reserve for the link. When a link is handed over, the link data initially remain stored in the first base station and the resources of the first base station initially remain held in reserve. At a later timepoint the link data are deleted and the resources are freed up. Furthermore, a method is used in which in the case of a handover the mobile station sends the network a query as to whether the network can support the handover by transferring the link data from the first mobile station to the second mobile station. If the mobile station is informed that the network cannot support the handover the mobile station makes the link data available to the second base station.

18 Claims, 6 Drawing Sheets

METHOD FOR HANDOVER, MOBILE STATION FOR HANDOVER AND BASE STATION FOR HANDOVER

FIELD OF THE INVENTION

The present invention relates to a mobile station and a network including at least a first base station and a second base station, in which a link between the mobile station and the network can be relayed through a handover from the first base station to the second base station of the network.

BACKGROUND INFORMATION

Today's digital mobile radio-communications systems are generally set up as cellular networks. A given access point, referred to below as the base station (BS), forms a given radio cell. In this case, the size of the cell is determined by the field propagation, the desired transmission rate and the number of mobile stations (MS) in radio contact with the base station. In current systems, these cells are subject to significant size constraints, as high frequencies are used and there are large numbers of mobile stations; as a result, the way the mobile station is passed from one cell to a neighboring cell is of major significance. Passing the mobile station link from radio cell 1 to radio cell 2 is termed 'handover' (HO). In this context, there are basically two kinds:

Handover in which active links are cleared (e.g., DECT)

Handover in which active links are handed off to the new BASE STATION (e.g., GSM).

There are various sub-categories of handover:

Soft handover: Handing off without the loss of individual data.

Hard handover: Handing off in which individual data are lost.

Forward handover: The mobile station seeks its target base station itself and registers there directly.

Backward handover: The mobile station registers HO at the old base station, which then performs the search for a suitable new base station.

Non-network supported: (forward HO only) When registering at the new base station, the mobile station itself is responsible for ensuring that all link parameter settings and link settings are modified.

Network supported: The network ensures that the two base stations involved can communicate directly. In this case, the old base station sends the new base station all relevant information regarding the mobile station and its links.

Mobile-station-initiated handover: The mobile station determines that an HO is required and initiates this process.

Base-station-initiated handover (forced HO): The base station wants to free up capacity or it determines that the radio link is deteriorating and informs the MS that it is to carry out an HO.

Currently, handover methods, e.g., in GSM, require that the backbone network be able to support the handover. However, in the future this cannot be taken for granted, as a number of different backbone networks may be connected. As a result, there are certain constraints regarding certain special combinations of HO types.

SUMMARY OF THE INVENTION

In contrast with the known methods, the known mobile stations and the known base stations, the present invention has the advantage that handover is also possible with networks in which communication between individual base stations is limited. In particular, networks of this kind may be encountered if, during a transitional phase, certain parts of the network are using a different standard from other parts of the network, or if the base stations have different capabilities. If, in such instances, a handover between two base stations using the same standard is performed, these base stations can exchange information and support the handover. This also ensures that handover from one base station to another base station is problem-free and reliable. However, if a handover from a base station using one standard to a base station using a different standard is to be performed, a situation may arise in which the base stations are unable to communicate with one another directly. In such a situation, it is conceivable that the network may be unable to support the handover by forwarding the link data for the link between the network and the mobile station from the one base station to the other base station. Furthermore, it may be impossible to guarantee reliable handover, i.e., the situation may arise that the mobile station tries to perform a handover and fails. In such cases the mobile station can return to the original base station without any problems.

New methods that solve some of the existing problems relating to forward HO are proposed. The first method allows network-supported and non-network-supported handover. The second method allows base-station-initiated and forward HO to be combined. Until now, this was only possible if one accepted the fact that the mobile station that was to perform the handover would not find a new base station, and its links would therefore be cleared.

The first part of the present invention allows a type of handover to be implemented that can be performed without network support. If, however, the network is capable of supporting handover, that capability can be utilized. To accomplish this, an additional signal is used, and is sent from the base station to indicate that this capability is available.

The second part relates to a method in which a forced forward HO is performed for which it is much less likely that the MS will have to clear its link.

DETAILED DESCRIPTION

Figure 1:
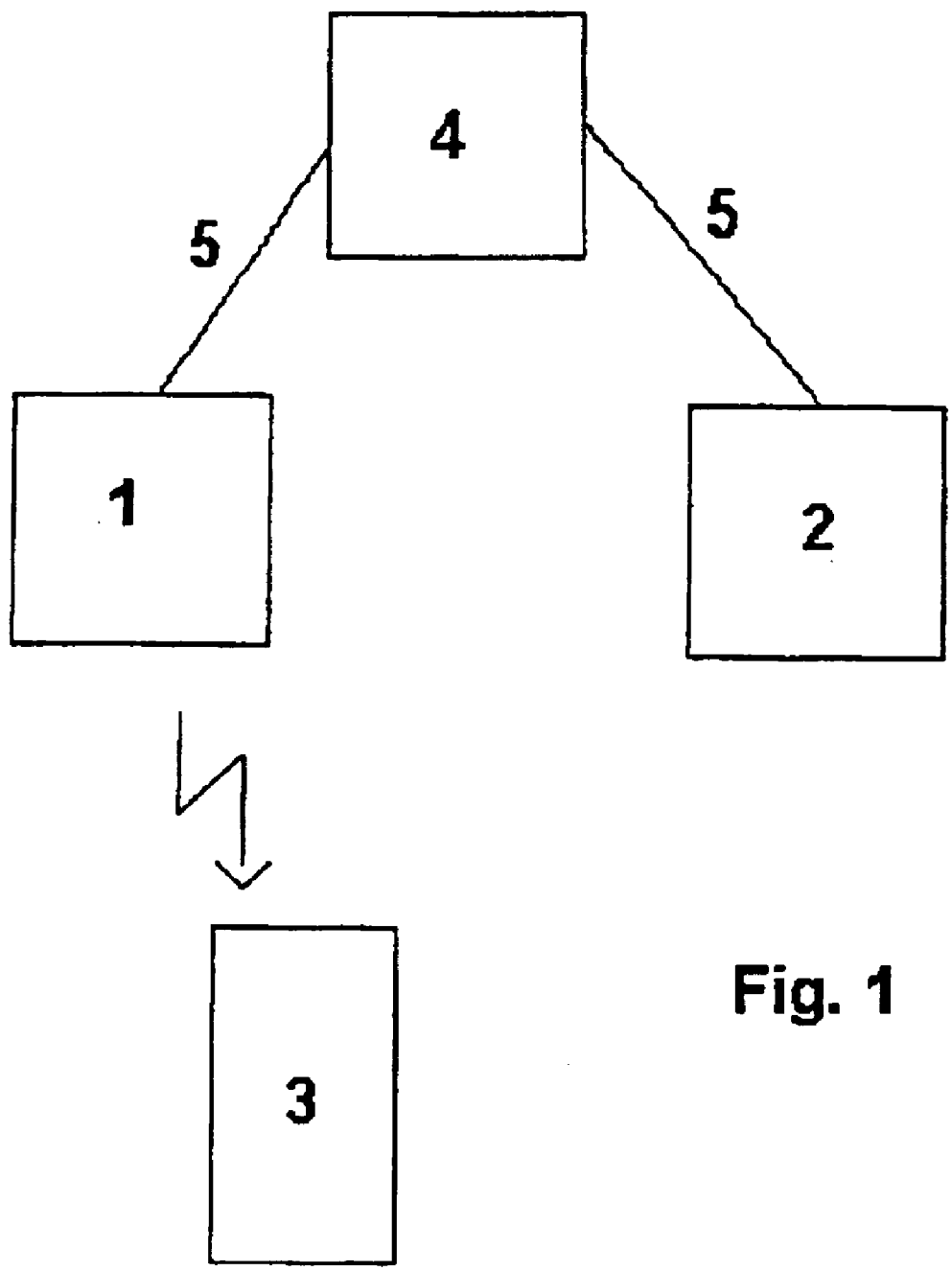
FIG. 1 shows a network linked to a mobile station in accordance with the present invention.

FIG. 1 shows a schematic diagram of a cellular mobile radio-communications system. In FIG. 1, two base stations (BS) 1, 2, each of which forms a radio cell, are shown by way of an example. In FIG. 1, the arrow is shown by way of an example and indicates that there is a radio link between BS 1 and mobile station (MS) 3. BS 1 and 2 are linked to a switching unit 4 via fixed lines 5 and form a fixed network. Switching unit 4 is linked to a further network, e.g., a standard telephone network (not shown). Thus mobile station (MS) 3 can exchange information (e.g., speech or data) with the network via fixed lines 5 and switching unit 4 and via a radio link to BS 1, 2. As MS 3 is mobile, it may be necessary to clear the radio link, which in FIG. 1 is initially with BS 1, from BS 1 and pass it to BS 2. Accordingly, the information flow, i.e., the link in switching unit 4, is transferred from BS 1 to BS 2. Clearing the radio link between BS 1 and MS 3 and activating the radio link between BS 2 and MS 3 is generally termed the handover.

Figure 2:
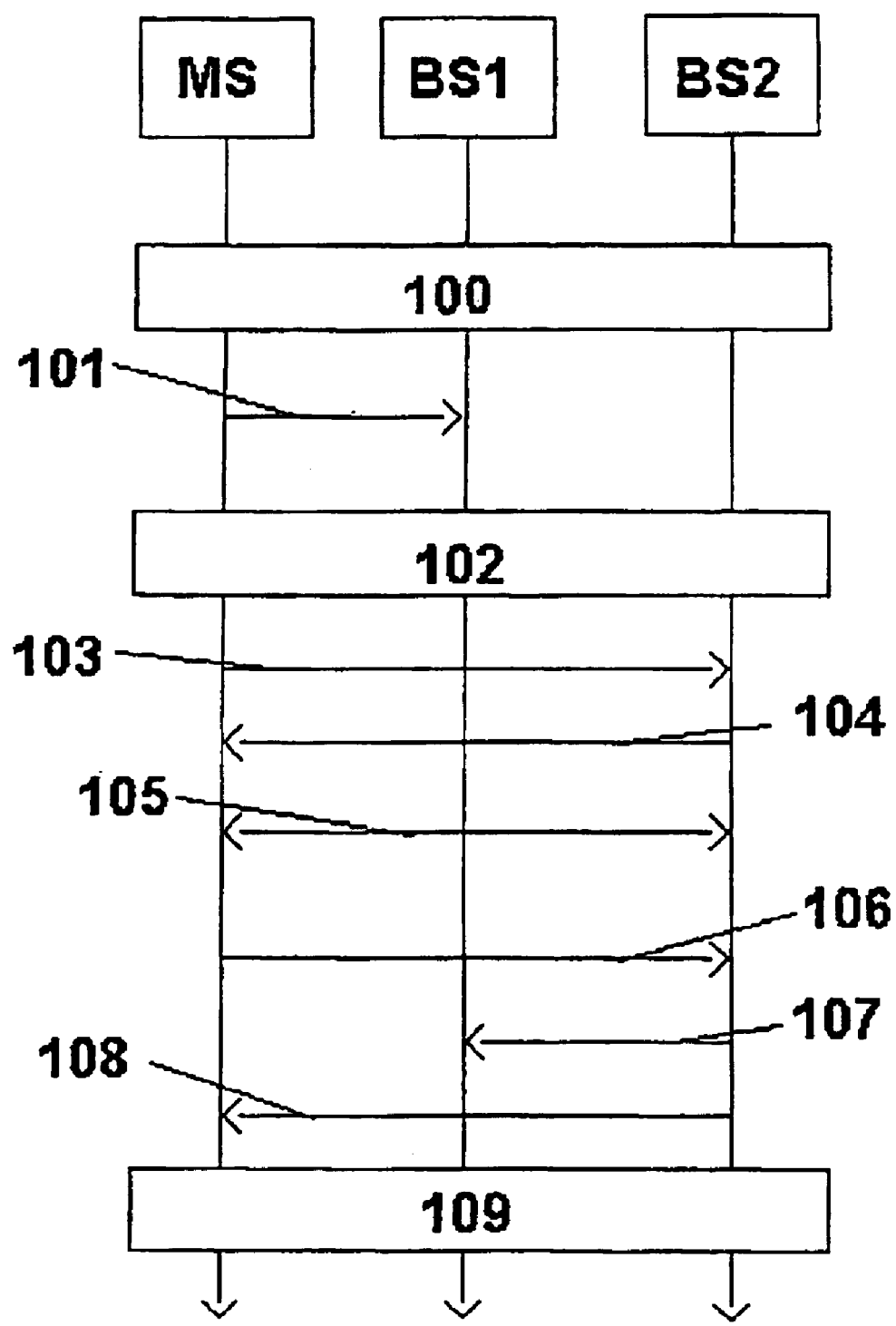
FIG. 2 is a first illustration of a first handover method according to the present invention.
Figure 3:
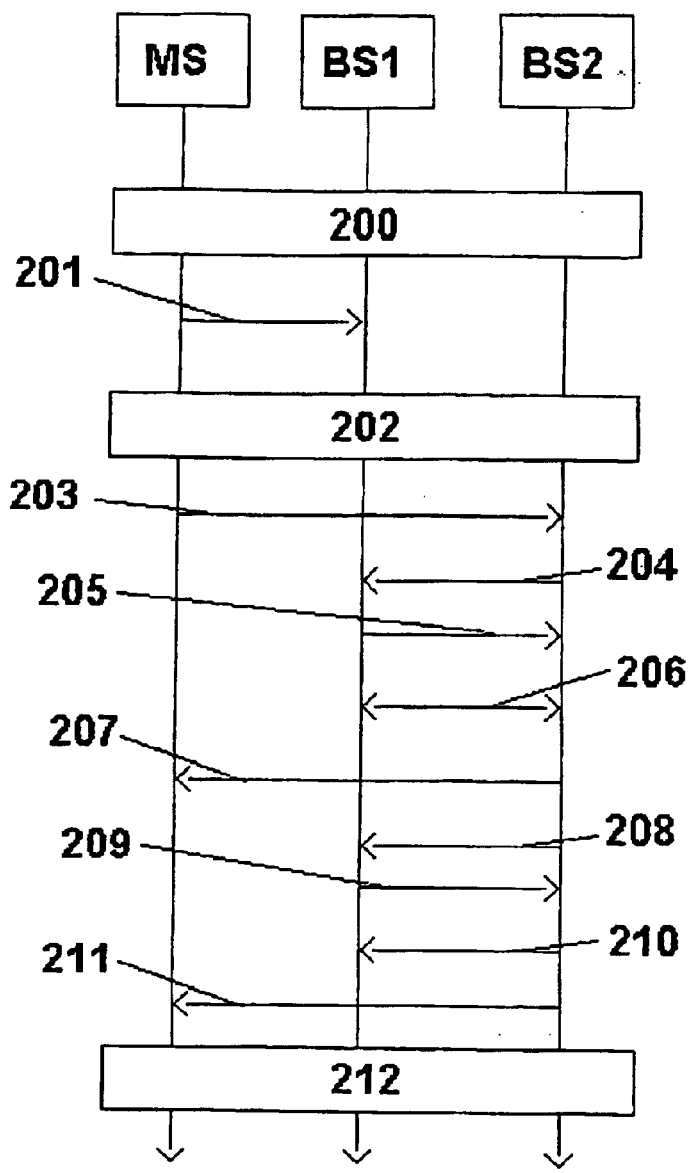
FIG. 3 is a second illustration of the first handover method according to the present invention.

To perform a handover of this kind, information must be exchanged between the BS 1, BS 2 and MS 3 involved. FIGS. 2 and 3 show a method in which handover is handled in different ways depending on whether BS 1 and BS 2, and switching unit 4, respectively, allow the information required for the handover to flow between BS 1 and BS 2 directly. FIGS. 2 and 3 therefore show three timelines, each timeline being assigned either to the MS, or to BS 1 or to BS 2. Herein, the time axis extends from top to bottom. Exchange of messages between the MS, BS 1 and BS 2 is shown by means of arrows, which in each case point from the timeline of the sending station to the timeline of the receiving station. Conditions of the system as a whole, or internal processing procedures in which no messages are exchanged, are shown as boxes extending across all three time lines. A plurality of associated messages may also be shown as a double-headed arrow.

In FIG. 2, the handing over of a mobile station MS from a first base station BS 1 to a second base station BS 2 is shown. In step 100, it is determined that a handover is required, e.g., because the quality of the link between the MS and BS 1 has fallen below a certain value. In the present example according to FIG. 2, this decision is taken by the MS, which then sends a message 101 to BS 1 informing it that it is now performing a handover (Handover Notify). After receiving this message, BS 1 stops sending data to the MS via the radio interface. In step 102, the MS looks for a new base station and synchronizes with that base station. However, the MS may already know which BS 2 it wants to register with, e.g., by measuring the field intensity of BS 2, so that the search for a new base station is no longer necessary. By synchronizing, the MS prepares itself for communication with new BS 2, e.g., by adapting to the bit rate of BS 2, which is slightly different from that of old BS 1. The MS then, by means of message 103, sends a handover query (Handover Request) to BS 2 in which it asks it to set up a link with the MS. In addition, request 103 also contains the address of BS 1 and can thus enable BS 2 to exchange data regarding the link with the MS with BS 1 directly. However, as BS 2 in the example according to FIG. 2 is unable to do this, it sends the MS a message 104 (No Net Support), indicating that the network is unable to send the information required for the link from BS 1 to BS 2. This may be because BS 1, BS 2, switching unit 4 or any other unit is unable to perform a direct exchange of data between BS 1 and BS 2 regarding the link with the MS. As the MS now knows that the network cannot support the handover, the MS uses a handover method in which it makes a plurality of items of information available to the new base station (BS 2). In a first step, the mobile station undergoes authentication at BS 2, as indicated by double-headed arrow 105. This authentication ensures that the MS is authorized to communicate with BS 2. Herein, security-related data, for example, key codes and encryption data, are swapped with the messages themselves; as a general rule a plurality of messages has to be sent back and forth, which takes a long time. Once BS 2 is convinced that the MS has access authorization, the MS sends a message 106 (Option Information), which contains the current parameters of the link, these being the same as they were for BS 1. BS 2 thereupon sends a message 107 to BS 1, requesting that the link be handed over to BS 2. In this case, sending this message from BS 2 to BS 1 is just one of a plurality of options; in principle, BS 2 may simply send this message to switching unit 4 which thereupon hands the link over from BS 1 to BS 2. As soon as the link has been handed over, BS 2 sends a confirmation 108 to the MS (Handover Confirm), to inform the MS that the link has now been handed over and handover is therefore complete. In condition 109, the MS is therefore linked to BS 2 and can exchange data with it.

FIG. 2 thus describes a handover in which the network is unable to support the MS during the handover by transporting some of the data required for communication with new BS 2 from old BS 1 to new BS 2. The MS, however, sends the equivalent of a query to the new BS as to whether the fixed network can provide support of this kind for the handover. In FIG. 3, a handover is described in which the network is capable of supporting the handover.

In FIG. 3, a handover of an MS from a BS 1 to a BS 2 is shown, in essentially the same manner as in FIG. 2. The beginning of the handover is carried out in the same way as described in the case of FIG. 2, i.e., function block 200 corresponds to block 100, message 201 corresponds to message 101, and block 202 corresponds to block 102 in FIG. 2. Via message 203, the MS again sends a handover query to BS 2, and herein the address of old BS 1 is supplied. As BS 2 is capable of communicating directly with BS 1, accordingly it sends a query 204 to find out whether BS 1 is also capable of sending the corresponding information (Net Support Question). As old BS 1 is capable of making the corresponding information available, accordingly it sends a response 205 (Net Support Possible) indicating that BS 1 is capable of making the data required for the link available to BS 2. In data exchange 206, first of all the data that enable BS 2 to determine whether the MS is authorized to communicate with BS 2 are exchanged. This can be carried out quickly, as the link between BS 1 and BS 2 is considerably faster than the link via the radio interface. Furthermore, the link between BS 1 and BS 2 may be deemed particularly secure, i.e., the authentication data of MS may be exchanged in unencrypted form, or at least security does not need to be as tight when these data are exchanged. After BS 2 has determined that the MS is authorized to communicate with BS 2, it uses message 207 to inform the MS that it intends to authorize the MS to communicate and that BS 2 will immediately obtain the data required for the link from BS 1. BS 2 then sends a request 208 to BS 1 (Option Request) asking BS 1 to send the data required for the link to BS 2. BS 1 then complies with this request in message 209 (Option Information), in which BS 1 sends all the data required for the link with the MS to BS 2. After receiving these data, BS 2 sends BS 1 or switching unit 4 that hands over the link to BS 2 within the network a request 210 asking that the link be handed over (Redirect Connection). BS 2 then sends a handover confirmation 211 to the MS, signaling the end of the handover process; this is the last message of the handover. In condition 212, the MS exchanges data directly with BS 2.

Figure 4:
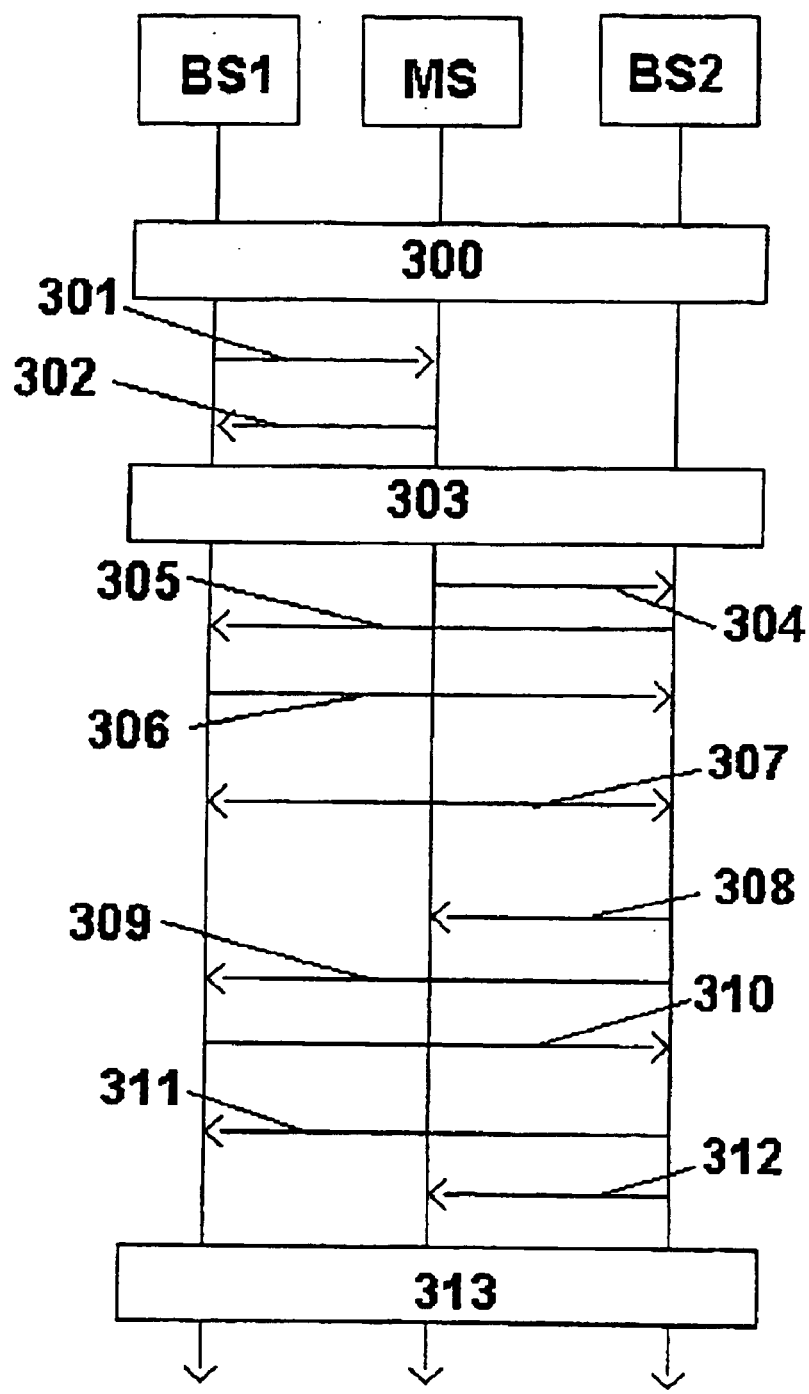
FIG. 4 is a first illustration of a second handover method according to the present invention.
Figure 5:
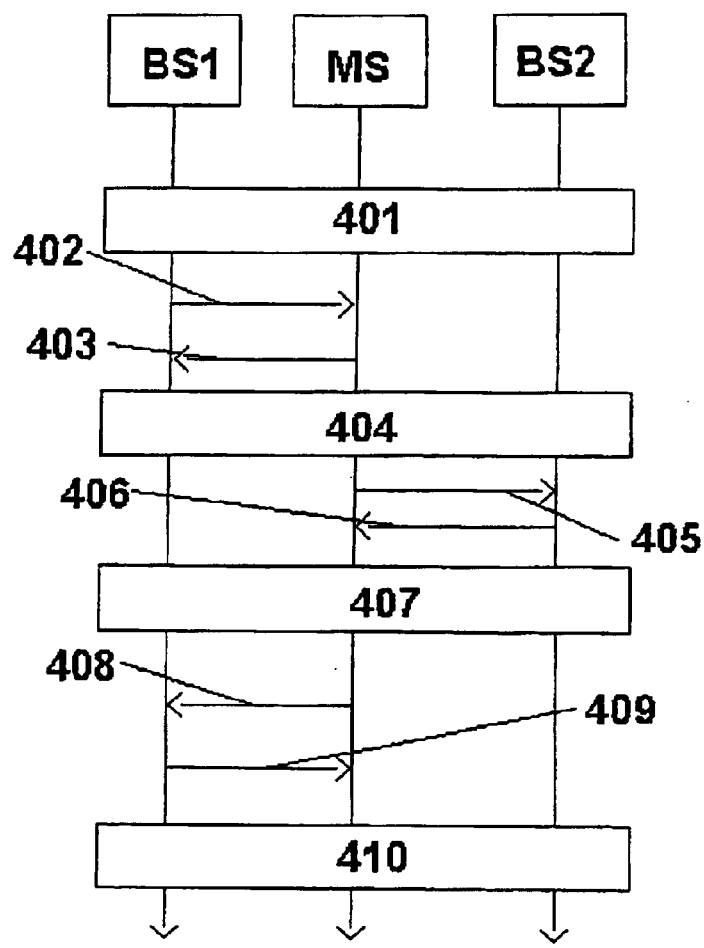
FIG. 5 is a second illustration of the second handover method according to the present invention.
Figure 6:
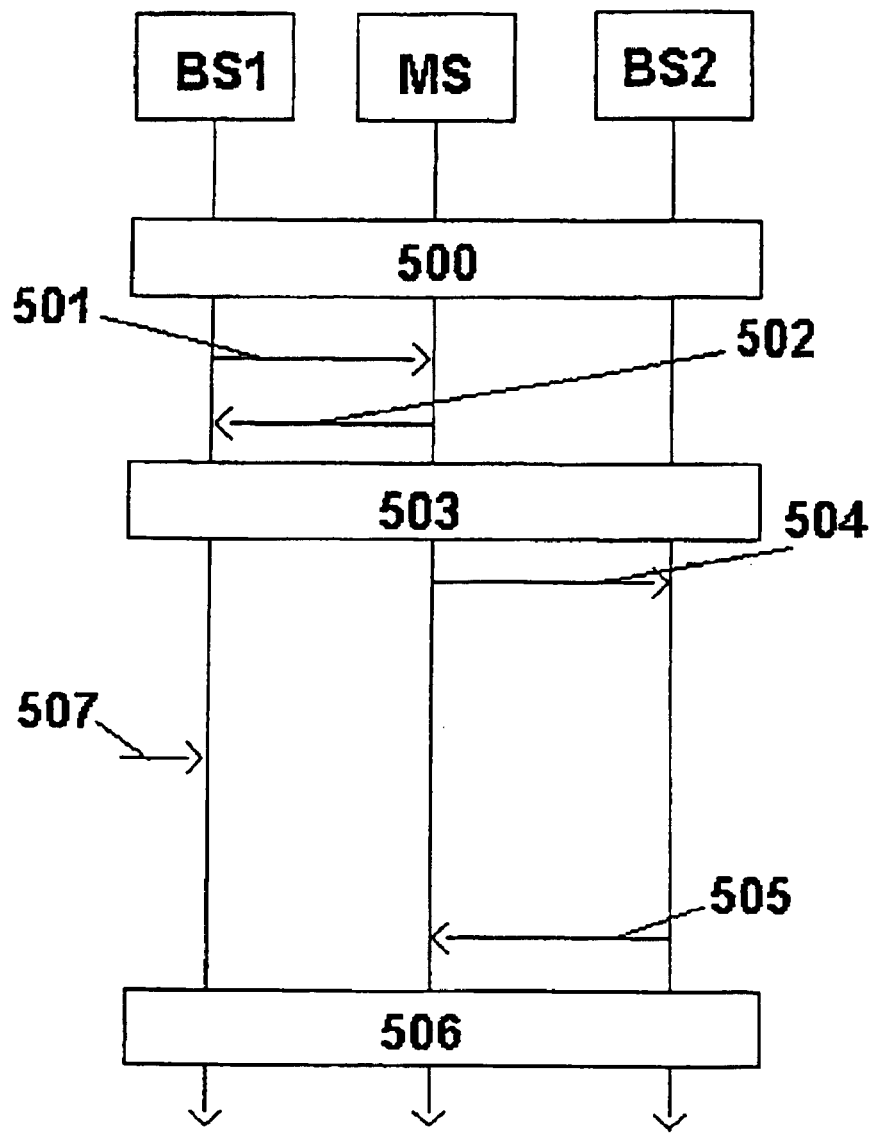
FIG. 6 is a third illustration of the second handover method according to the present invention.

Thus, in the method according to FIGS. 2 and 3, during a handover a distinction is made between whether or not the network can support the handover via direct communication between the stations of the fixed network that are involved. If the mobile station determines that the network cannot support the handover, it makes available the information required for the link itself. If the mobile station determines that the network can support the handover, it will rely on the fact that the fixed network stations involved can exchange the data among themselves. The base stations involved behave in the same way. If they receive a handover query, they will try to obtain data from the old base station. If this is impossible, they will ask the mobile station to make the corresponding data available. FIGS. 4 to 6 relate to a method for handing over an MS from an old base station BS 1 to a new base station BS 2. If the handover to new base station BS 2 fails, the MS can reactivate the link to old base station BS 1 by sending a simple message. To accomplish this, the information required for the link remains stored in BS 1, and the resources required for the radio link are initially not reassigned.

The method described here allows the procedure to work without network support initially, and can then make use of that capability if the network does have it. To accomplish this, during the exchange of the messages required to perform the handover, the new base station indicates whether it is capable of providing network support. This can either be a fixed setting, or the new base station can try to reach the old base station and determine whether it offers this service. If the service is not supported, the mobile station must send all its link data and link options to the new base station itself.

As a general rule, the transmission rate on the backbone network is much faster than via the air interface (typically 155 Mbit/s versus 20 Mbit/s); for this reason, sending the link data from the mobile station to the base station is the slower solution. Moreover, it places an additional load on the air transmission rate, which is a limited resource. Therefore a solution of the kind shown in FIG. 3 is preferable. Herein, most of the information required is sent via the backbone network. As this is generally significantly faster than radio transmission, less time is required for the HO. As a result, fewer data sent to the old base station in the period leading up to the handover are lost (hard handover).

A further significant advantage is that links within the backbone network are generally secure links.

Because in most mobile radio-communications systems a mobile station must first be authenticated at a base station before data transmission can take place, this authentication procedure must also be carried out in the case of an HO with no network support. This authentication procedure does not have to be carried out in the case of an HO that does have network support, or can be considerably simplified, the required keys (encryption keys) being sent directly between the base stations.

FIG. 4 shows a handover in which the MS successfully performs a handover to new BS 2. In decision block 300, BS 1 decides that it wishes to clear the link to the MS. This may, for example, be because the radio cell created by BS 1 is overloaded and capacity is to be freed up. BS1 then sends the MS a request 301 asking the MS to perform a handover (Force Handover). The MS confirms this message via message 302 (Handover Notify), with which it indicates that it is now trying to perform a handover to another base station. BS 1 then stops transmitting data via the radio interface. However, the data required for the link initially remain stored in BS 1, and initially BS 1 does not reassign the resources (e.g., radio frequencies or similar) required to maintain the link with the MS. The next steps in the handover, 303 to 311, are performed in the same way as steps 202 to 210 in FIG. 3. In step 303, the MS looks for a new base station and synchronizes with that base station. Via message 304, the MS sends a handover query to BS 2 and simultaneously sends the address of old BS 1. Then, in step 305, BS 2 sends BS 1 a message asking whether it can support the handover. In message 306, BS 1 sends a positive response, i.e., it too can support the handover. In message exchange 306, BS 1 and BS 2 swap the authentication parameters of the MS. Via message 308, BS 2 indicates to the MS that the handover is supported by the network. In message 309, BS 2 asks BS 1 for the information required for the link, which is then sent in message 310. Thus handover steps 303 to 310 correspond to handover steps 202 to 209 in FIG. 3. Step 311 corresponds to step 210, i.e., BS 2 informs BS 1 that the link is being handed over from BS 1 to BS 2. For BS 1, this message is simultaneously the signal that the information required for the link with the MS no longer needs to be stored and, respectively, that the resources that were held in reserve in case the MS returned are no longer required. BS 1 can therefore delete the information and, respectively, the resources that were held in reserve can be assigned elsewhere. In message 312, BS 2 informs the MS that the handover has now been completed successfully, and thus in condition 313 the link between the MS and BS 2 has been set up. BS 1 in turn has now reduced the load on the radio cell as desired, as the MS is now linked to BS 2.

Below, with reference to FIG. 5, the purpose of storing the link data and holding the resources in reserve will be explained. In FIG. 5, reference numbers 401 to 405 refer to the same conditions and messages as reference numbers 300 to 304 in FIG. 4. However, BS 2 reacts to handover query 405 of the MS with message 406, in which the handing over of the MS is rejected. This may be, for example, because the radio cell of BS2 is also overloaded and therefore cannot set up any links with new MSs. The MS, which has been thus informed that a handover cannot be performed, therefore synchronizes once again in condition 406 with BS 1 and, via message 408 sends a message to BS 1 indicating that the MS wants to maintain the link with BS 1. The link between BS 1 and the MS can be re-established by means of simple acknowledge message 409. This procedure is of course performed very quickly as the MS does not need to be authenticated again at BS 1, and the old link data which are still stored in BS 1 can still be used. Thus in condition 410 the MS is still linked to BS 1 and not to BS 2.

Thus the method shown in FIGS. 4 and 5 allows an MS to try to perform a handover to another base station by way of a test. If this handover fails, the MS can return to original old base station BS 1 easily and without requiring much time for this procedure. Thus the attempt at a handover does not create a long interruption in data flow, as the time-consuming authentication procedures and re-storing of the link data do not have to be carried out. This method can therefore be advantageously used in networks in which the network is not capable of preparing the handover for the mobile station. In particular, this is the case in networks in which base stations with different capabilities are operating alongside one another. For example, this may be true if, during a transition phase from one mobile radio-communications generation to the next, there is a period in which base stations using the new standard and base stations using the old standard are present, the mobile stations being able to communicate with both types of base station, but the base stations being incapable of communicating among themselves to a sufficient degree. In such cases, the mobile station may be asked by a first base station BS 1 to perform a handover to another base station by way of a test. If this handover fails, the mobile station can return to the old base station without any difficulty and without interrupting data flow to a significant extent. The base station will then try to reduce the load on the radio cell by sending requests to other mobile stations.

Of course the link data are not stored forever, nor are the resources held in reserve in BS 1 forever. FIG. 6 shows a further option in which function blocks or messages 500 to 504 correspond to function blocks or messages 300 to 304 in FIG. 4. However, in this case BS 1 starts a timer, timepoint 507 being marked on the time axis assigned to BS 1 based on when the time runs out. As shown in FIG. 6, initially the MS does not receive a message in response to its message 504, but rather a very long period of time elapses e.g., due to a malfunction or similar, before BS 2 sends message 505 indicating that BS 2 cannot set up a link to the MS. Because all link data in BS 1 were deleted and the resources that were initially held in reserve for the link were reassigned when the timer ran out at timepoint 507, the MS cannot re-register at BS 1 via a simple message. Thus in condition 506 the MS has lost its link to the network and must perform a whole new register procedure if it wishes to set up a link with the network again.

Current solutions (e.g., in GSM) for forced handover are always based on backward HO. Herein, the old base station looks for a suitable new base station and informs the mobile station of it. The mobile station then tries to reach this new base station. In the case of the BRAN system, which is currently undergoing the standards process at the ETSI, this method probably will not be possible in the first phase. Initially, only a forward HO will be feasible. Nonetheless, it makes sense to be able to perform a forced HO so that a network's overall performance can be better utilized. The present invention prevents a situation in which a mobile station is forced into an HO by its old base station (forced), this MS then being unable to find a base station or finding none that can support the traffic of this mobile station. If the mobile station then wishes to return to its old base station, under some circumstances it will already have accepted a new mobile station and will no longer be able to serve the old mobile station. As a result, the old mobile station's links will be cleared. It is therefore proposed that in the case of a handover the base station initially continue to hold the data and resources. To accomplish this a timer, for example, is started when the old base station asks the mobile station to look for a new base station (or when the mobile station confirms this). The base station holds the resources of the mobile station in reserve until it receives the request to redirect the links or until the timer runs out. During this time the mobile station has time to look for a new base station that is capable of carrying the traffic. If the search for a new base station is unsuccessful, the MS re-registers at its old BS and keeps its previous settings. If the MS does not register within the time defined by the timer the old base station frees up the resources and deletes the MS from its lists.

It may of course be appropriate to use a timer in the case of any of the examples shown in FIGS. 4 to 6. The first example is the successful handover shown in FIG. 4. Herein, the network-supported handover described above is shown by way of an example. However, this is not the only option: the method described works just as well with other handover options. In this example, the message that the links are being redirected reaches the old base station before the time runs out. After that, the timer is cleared and the resources can be used for another MS.

The second example shows that the mobile station was unable to register at another base station (in this case due to a rejection, but in some cases this is because no other base station is receiving). Herein, the mobile station registers with the old base station before the timer runs out. The old link is then set up again (see FIG. 5). The base station can then request that another mobile station in its area perform an HO.

The third example (FIG. 6) shows what happens if the timer runs out without the base station having received a message. After the time runs out, the resources within the base station are freed up and may be reassigned to a new mobile station.

What is claimed is:

1. A mobile station for use with a network including a first base station and a second base station that achieves a handover from the first base station to the second base station by:
   storing link data for a link in a first base station,
   holding in reserve for the link resources of the first base station, and
   when the link is to be handed over to the second base station:
      initially maintaining a storage of the link data in the first base station,
      initially causing the resources of the first base station to remain held in reserve, and
      at a later timepoint determined by a fixed period of time predefined at a beginning of the handover, deleting the link data from the first base station and freeing up the resources of the first base station, the mobile station comprising:
   an arrangement for reactivating the link with the first base station if the handover is unsuccessful.

2. A method for handing over a link existing between a mobile station and a network by transferring from a first base station of the network to a second base station of the network, comprising the steps of:
   storing link data for the link in the first base station;
   when a handover is to be attempted, causing the mobile station to send to the network a query as to whether the network is capable of supporting the handover by transferring the link data from the first base station to the second base station; and
   if the mobile station is informed that the network cannot support the handover, causing the mobile station to make the link data available to the second base station.

3. A mobile station for use in a network that is capable of handing over an existing link with the mobile station from a first base station of the network that stores link data to a second base station of the network, the mobile station comprising:
   an arrangement for sending to the network a query as to whether the network is capable of supporting the handover by transferring the link data from the first base station to the second base station; and
   an arrangement for making the link data available to the second base station if the mobile station is informed that the network is incapable of supporting the handover.

4. A base station for use as one of a first base station and a second base station in a network capable of establishing with a mobile station a link that is capable of being handed over from the first base station of the network to the second base station of the network, comprising:
   an arrangement for storing link data for the link;
   an arrangement for processing a query sent by the mobile station to the network as to whether the network is capable of supporting a handover involving a transfer of the link data from the first base station to the second base station;

an arrangement for informing the mobile station whether the network is capable of supporting the handover; and an arrangement for asking the mobile station for the link data if the network is incapable of supporting the handover.

5. A method for handing over a link between a mobile station and a network having at least a first base station and a second base station, the link being handed over from the first base station to the second base station, comprising:

storing in the first base station link data until at least a later timepoint, the link data containing current parameters of the link;

reserving in the first base station a link resource for the link until at least the later timepoint;

receiving at the network a query from the mobile station as to whether the network is capable of transferring the link data from the first base station to the second base station;

causing the mobile station to transmit the link data to the second base station, if the network cannot transfer the link data; and handing over the link from the first base station to the second base station.

6. The method of claim 5, further comprising:

receiving at the second base station a handover request from the mobile station.

7. The method of claim 5, further comprising:

deleting the link data stored in the first base station and releasing the link resource reserved in the first base station, in response to a successful completion of handing over the link.

8. The method of claim 5, further comprising:

re-establishing the link with the first base station using the stored link data and the reserved link resource in the first base station for the link, in response to an unsuccessful completion of handing over the link.

9. The method of claim 5, further comprising:

determining the later timepoint based on a message from one of the mobile station and the second base station regarding the successful completion of handing over the link.

10. The method of claim 5, further comprising:

determining the later timepoint by predefining a fixed period of time at a beginning of handing over the link.

11. The method of claim 5, further comprising:

causing the first base station to transfer the link data to the second base station, if the network can transfer the link data.

12. A mobile station, comprising:

an arrangement for transmitting link data for a link between the mobile station and a first base station of a network to a second base station of the network, the link data containing current parameters of the link; and an arrangement for reestablishing the link with the first base station, wherein:

the first base station stores the link data;

the first base station reserves a link resource for the link between the mobile station and the first base station;

if the network cannot support handing over the link by transferring the link data from the first base station to the second base station, the mobile station transmits the link data to the second base station;

in response to the second base station receiving the link data, the link is handed over from the first base station to the second base station;

in response to a successful completion of handing over the link, the link data stored in the first base station is deleted and the link resource reserved in the first base station is released; and in response to an unsuccessful completion of handing over the link, the link between the mobile station and the first base station is re-established using the stored link data and the reserved link resource in the first base station for the link.

13. The mobile station of claim 12, further comprising:

an arrangement for transmitting a request to the network for handing over the link between the mobile station and the network from the first base station to the second base station.

14. The mobile station of claim 12, further comprising:

an arrangement for transmitting a query to the network as to whether the network is capable of supporting the handover by transferring the link data from the first base station to the second base station.

15. The mobile station of claim 12, further comprising:

an arrangement for receiving a message from the network indicating whether the network is capable of supporting the handover by transferring the link data from the first base station to the second base station.

16. A first base station of a network for use with a mobile station, the network achieving handing over of a link between the mobile station and the network from a first base station to a second base station of the network, comprising:

an arrangement for storing link data for the link, the link data containing current parameters for the link; and an arrangement for reserving a link resource for the link, wherein:

if the network is able to support handing over the link by transferring the link data from the first base station to the second base station, the first base station transfers the link data to the second base station;

if the network cannot support handing over the link by transferring the link data from the first base station to the second base station, the mobile station transmits the link data to the second base station;

in response to the second base station receiving the link data, the link is handed over from the first base station to the second base station;

in response to a successful completion of handing over the link, the link data stored in the first base station is deleted and the link resource reserved in the first base station is released; and in response to an unsuccessful completion of handing over the link, the link between the mobile station and the first base station is re-established using the stored link data and the reserved link resource in the first base station for the link.

17. The first base station of claim 16, further comprising:

an arrangement for re-establishing the link between the first base station and the mobile station.

18. A mobile station for use with a network including a first base station and a second base station that achieves a handover from the first base station to the second base station by:

storing link data for a link in a first base station, holding in reserve for the link resources of the first base station, and when the link is to be handed over to the second base station:
   initially maintaining a storage of the link data in the first base station,
   initially causing the resources of the first base station to remain held in reserve, and
   at a later timepoint determined based on a message from one of the mobile station and the second base station regarding a successful completion of handing over the link, deleting the link data from the first base station and freeing up the resources of the first base station, the mobile station comprising:
an arrangement for reactivating the link with the first base station if the handover is unsuccessful.

* * * * *